(12) United States Patent
Atkins et al.

(10) Patent No.: US 8,064,744 B2
(45) Date of Patent: Nov. 22, 2011

(54) PLANAR WAVEGUIDE LENS DESIGN

(75) Inventors: Graham Roy Atkins, Kaleen (AU); Dax Kukulj, Acton (AU); Robert Bruce Charters, Palmerston (AU)

(73) Assignee: RPO Pty Limited, Acton, ACT (AU)

( * ) Notice: Subject to any disclaimer, the term of this patent is extended or adjusted under 35 U.S.C. 154(b) by 298 days.

(21) Appl. No.: 11/558,587

(22) Filed: Nov. 10, 2006

(65) Prior Publication Data

US 2008/0111796 A1    May 15, 2008

(51) Int. Cl.
*G02B 6/10* (2006.01)
*G02B 6/26* (2006.01)
*G02B 6/32* (2006.01)
*G02B 6/34* (2006.01)
*G02B 6/42* (2006.01)
*G02B 27/10* (2006.01)
*G06F 3/033* (2006.01)
*G06F 3/042* (2006.01)

(52) U.S. Cl. .............. 385/33; 385/31; 385/37; 385/132; 345/175; 345/179; 359/625; 359/626

(58) Field of Classification Search .................... 385/33, 385/31, 37, 132; 345/175, 179; 359/625, 359/626

See application file for complete search history.

(56) References Cited

U.S. PATENT DOCUMENTS

| | | | |
|---|---|---|---|
| 3,976,364 A | 8/1976 | Lindemann et al. | |
| 4,119,362 A | 10/1978 | Holzman | |
| 4,707,073 A * | 11/1987 | Kocher | 219/121.6 |
| 4,776,661 A * | 10/1988 | Handa | 385/37 |
| 5,253,319 A | 10/1993 | Bhagavatula et al. | |
| 5,914,709 A | 6/1999 | Graham et al. | |
| 6,181,842 B1 | 1/2001 | Francis et al. | |
| 6,351,260 B1 * | 2/2002 | Graham et al. | 345/179 |
| 6,771,426 B2 * | 8/2004 | Yamamoto et al. | 359/641 |
| 6,959,138 B2 | 10/2005 | Steenblik et al. | |
| 2001/0033714 A1 * | 10/2001 | Delisle et al. | 385/33 |

(Continued)

FOREIGN PATENT DOCUMENTS

EP        0058707        5/1984

(Continued)

OTHER PUBLICATIONS

Australian Patent Office International-Type Search Report; dated Mar. 14, 2005, 3 pages.

(Continued)

*Primary Examiner* — Ryan Lepisto
*Assistant Examiner* — Jerry Blevins
(74) *Attorney, Agent, or Firm* — Miller, Matthias & Hull LLP

(57) ABSTRACT

This invention relates to an improved design for the transmit and receive optical elements of a waveguide-based optical touch screen sensor, where at least one converging lens is incorporated within the body of each transmit and receive element. The optical elements of the improved design are more mechanically robust, easier to incorporate into the touch screen assembly, and are less susceptible to stray light and the ingress of foreign matter. In one embodiment the converging lens collimates the light into a plane wave. In another embodiment the converging lens focuses the light to an external point. In yet another embodiment, each transmit and receive element also includes at least one diverging lens. The transmit and receive elements and associated waveguides preferably comprise photo-patternable polymers.

28 Claims, 12 Drawing Sheets

U.S. PATENT DOCUMENTS

| | | |
|---|---|---|
| 2003/0235047 A1 | 12/2003 | Choi et al. |
| 2004/0201579 A1 | 10/2004 | Graham |
| 2005/0169575 A1* | 8/2005 | Dimas et al. .................. 385/31 |

FOREIGN PATENT DOCUMENTS

| | | |
|---|---|---|
| EP | 0557713 | 9/1993 |
| EP | 1271211 A2 | 1/2003 |
| GB | 221324 | 1/1990 |
| JP | 56078814 | 6/1981 |
| JP | 56078814 A | 6/1981 |
| JP | 2003190571 | 3/2004 |
| WO | WO 2005/121851 A2 | 12/2005 |
| WO | WO 2006/045142 A1 | 5/2006 |

OTHER PUBLICATIONS

Chang, et al., Design of Low-Loss Tapered Waveguides Using the Telescope Structure Compensation, IEEE Photonics Technology Letters. Oct. 2003, vol. 15, pp. 1378-1380.

* cited by examiner

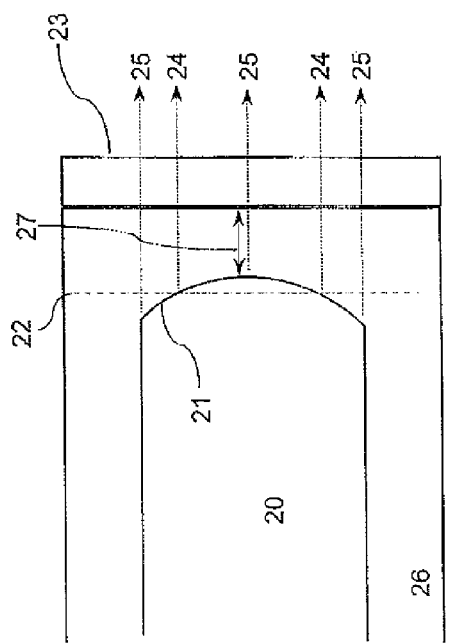
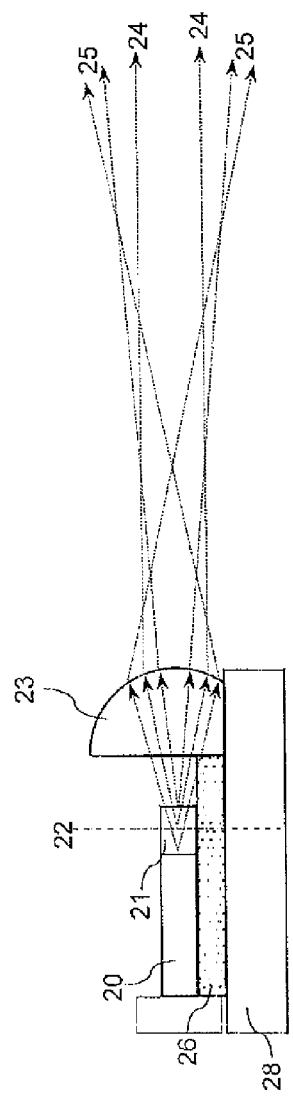

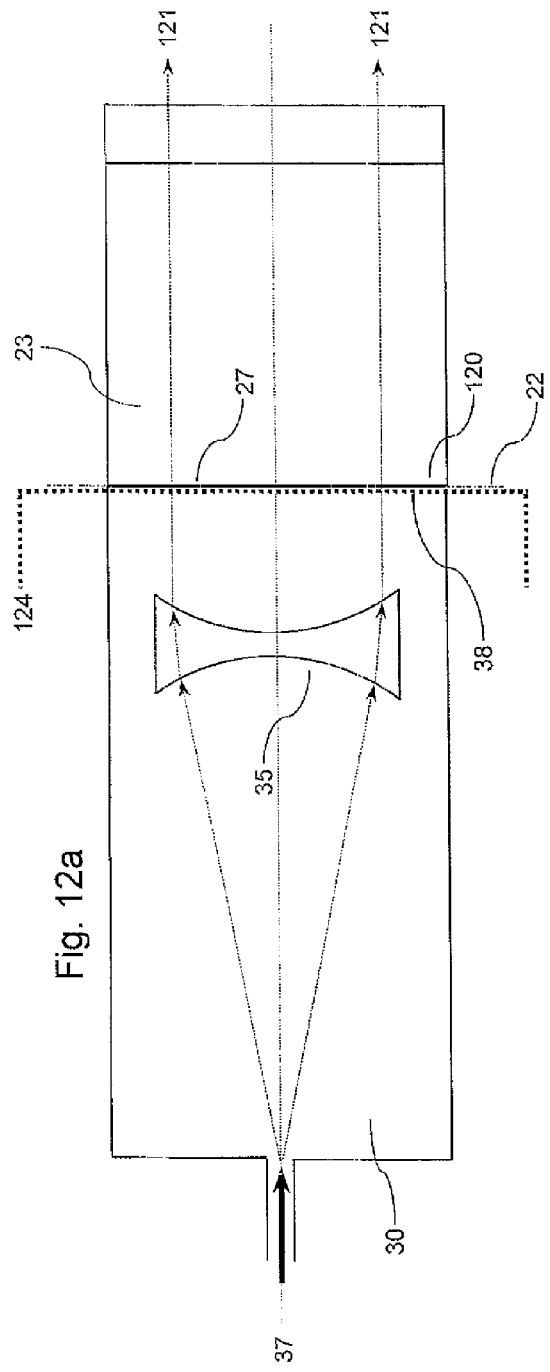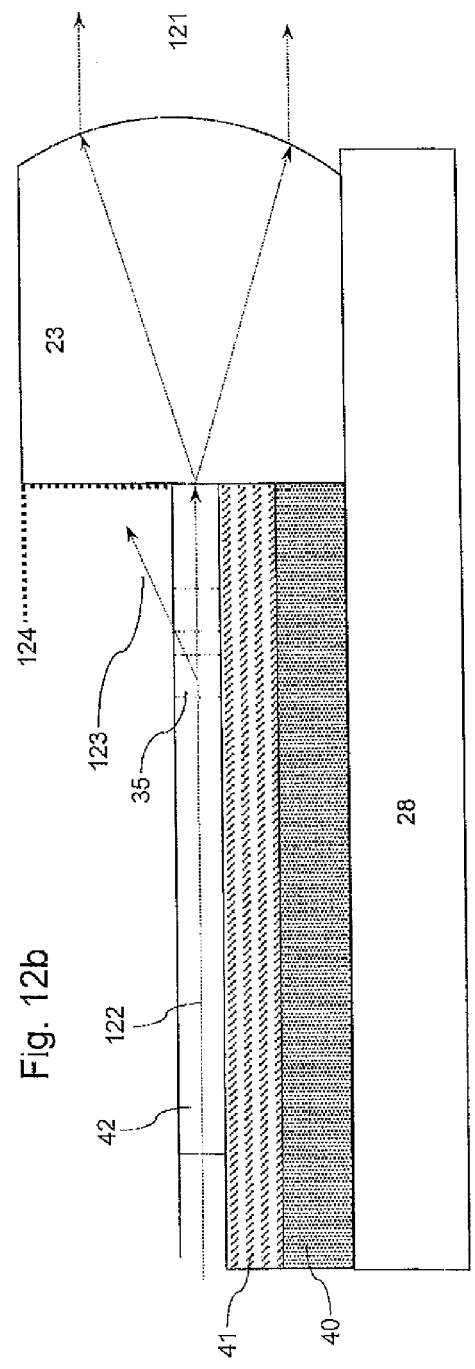

PLANAR WAVEGUIDE LENS DESIGN

FIELD OF THE INVENTION

This invention relates to improved designs for transmit and receive optical elements of a waveguide-based optical touch screen sensor.

BACKGROUND TO THE INVENTION

Any discussion of the prior art throughout the specification should in no way be considered as an admission that such prior art is widely known or forms part of common general knowledge in the field.

FIG. 1 illustrates the operation of an optical touch screen sensor 10 described in U.S. Pat. Nos. 5,914,709, 6,181,842 and 6,351,260, and U.S. Patent Application Nos. 2002/0088930 A1 and 2004/0201579 A1 (the contents of which are incorporated into this specification by way of cross-reference). In this optical touch screen sensor design, integrated optical waveguides 11, 12 are used to launch an array of light beams 13 across a screen, then collect them at the other side of the screen and conduct them to a position-sensitive detector A touch event 14 (eg by a finger or stylus) is detected as a shadow 15, with position determined from the particular beam(s) blocked by the touching object. The touch screen sensors are usually two dimensional and rectangular, with two arrays (X,Y) of transmit waveguides along adjacent sides of the screen, and two corresponding arrays of receive waveguides along the other two sides of the screen. As part of the transmit side, in one embodiment a single optical source (such as a light emitting diode (LED) or a vertical cavity surface emitting laser (VCSEL)) launches light into a plurality of waveguides that form both the X and Y transmit arrays. In another embodiment, a separate optical source is used for each of the X and Y transmit arrays. In an existing design for the transmit side, the waveguide arrays guide light from the optical source to tows offenses 16 that expand the guided light beams in the horizontal (i.e. X, Y) plane, then collimate them in the horizontal plane as they are launched across the screen face. Collimation in the vertical plane may be achieved with an external vertical collimating lens (VCL), for example a cylindrical lens, not shown in FIG. 1. The receive side is essentially identical, and on each side the arrays of waveguides and lenses are positioned within the bezel of the screen. To minimise the width of the bezel, it is desirable for the transmit and receive elements to be as short as possible. For reasons of cost and ease of fabrication, it is highly preferred to form the waveguides and lenses out of a photopatternable polymer material. Optical touch screens typically operate with infrared light to avoid interfering with the display, however visible light may be used if required.

The transmit and receive elements of the existing design as shown in U.S. Pat. Nos. 5,914,709, 6,181,842 and 2004/0201579 A1 encounter difficulties with collimation in the vertical plane, where for ease of assembly it is convenient to use a single VCL for all transmit or receive elements in each array along the sides of the optical touch screen. The placement of a VCL and a conventional transmit element 20 on a common base 28 is shown in FIG. 2a (plan view) and 2b (side view), with the end of substrate 26 butted against the back of VCL 23. Common base 28 could alternatively be placed on the top surface of transmit element 20. Transmit element 20 would normally be sandwiched between lower and upper cladding layers (as shown in FIG. 4b), but these have been omitted for simplicity. It can be seen that it is difficult for the entire curved end face 21 of transmit element 20 to be positioned at the focal plane 22 of VCL 23. Therefore while emerging rays 24 can be perfectly collimated in the vertical direction, this is not the case for rays 25. On the transmit side, the unavoidable spread of the beam in the vertical direction from incomplete collimation is simply a source of stray light. On the receive side however, the problem is potentially more serious because of the possibility of out-of-plane stray light entering the receive elements (this effect can be seen by reversing the direction of light rays 25 in FIG. 2b)

It can also be seen that optimal placement of focal plane 22 with curved end face 21 depends critically on gap 27 between the apex of curved end face 21 and the end of substrate 26. A simple approach in achieving the placement is to butt substrate 26 against VCL 23, which can be achieved in several ways well known in the art (for example a pick-and-place machine with a vision system). Nevertheless, distance 27 is governed by the amount that the substrate 26 protrudes past the apex of curved end face 21, and its accuracy depends on the tool used to cut the substrate. By means of alignment marks, a dicing saw typically can cut silicon wafers with an accuracy of approximately 10 μm, which may be sufficient for the present application. However for reasons of cost, it may be preferable to use plastic substrates, and unlike silicon where the only dimensional variable is thermal expansion (which is relatively easy to control), the dimensions of plastic substrates are also known to depend on humidity and thermal and mechanical history, which are far more difficult to control. For these reasons, accurate inter-layer registration is a known problem in the fabrication of multilayer plastic devices such as flexible displays.

Yet another problem with the transmit and receive elements of the existing design is that curved end face 21, being a reflective surface, must be an interface with a large refractive index difference, such as an air/polymer interface. Therefore when an upper cladding (highly desirable for optical isolation and mechanical protection of the waveguides) is being deposited, it has to be patterned so that it does not cover the curved end face, as discussed in U.S. Patent Application No. 2005/0089298 A1 (incorporated herein by reference in its entirety). However there is then a risk that the exposed curved end face could be damaged, for example during assembly of the optical touch screen sensor. The fact that curved end face 21 is an optical surface also means that gap 27 between transmit element 20 and VCL 23 cannot be filled with a transparent adhesive, which would aid in connecting the two components and prevent foreign matter from entering gap 27 and blocking the light.

It is an object of the present invention to overcome or ameliorate at least one of the disadvantages of the prior art, or to provide a useful alternative.

SUMMARY OF THE INVENTION

To this end, a first aspect of the invention provides an input device for an electronic device comprising:
  at least one light source;
  at least one light detector to detect light intensity at a plurality of light detecting elements;
  an input area defining a plane;
  and a waveguide structure including a plurality of waveguides with associated slab regions composed of a first material with first refractive index, wherein:
  each of said associated slab regions has a substantially straight end face and contains at least one converging lens;
  said light source couples light into a first set of waveguides with associated first set of slab regions of said waveguide structure;

said first set of waveguides directs the light into said associated first set of slab regions;

said converging lenses focus the light in the plane of the input area to produce a first grid of light beams;

and said first grid of light beams traverses the input area in a first direction and is directed to the light detecting elements of said light detector by a second set of waveguides with associated second set of slab regions of said waveguide structure.

Preferably, the first set of waveguides with associated first set of slab legions sends beams of light across the input area towards corresponding waveguides of the second set of waveguides with associated second set of slab regions.

Preferably, the converging lens is composed of a second material with refractive index different to that of said first material, and is selected from a Luneburg lens, a Fresnel lens, a chirped grating or an in-plane lens.

More preferably, the converging lens is an in-plane lens.

In one embodiment, the second material has refractive index less than the refractive index of said first material, and the converging lens is bi-concave, plano-concave or meniscus concave in shape. Preferably, the second material is air. In an alternative embodiment, the second refractive index is greater than said first refractive index, and the converging lens is bi-convex, plano-convex or meniscus convex in shape.

Preferably, each light beam is collimated into a plane wave

Alternatively, each light beam is focused to a point located within said input area Preferably, each associated slab region additionally contains at least one diverging lens. More preferably, each associated slab region contains one diverging lens and one converging lens in a beam expander configuration.

In a further preferred embodiment, said light source couples light into a third set of waveguides with associated third set of slab regions of said waveguide structure;

said third set of waveguides directs the light into said associated third set of slab regions;

said converging lenses focus the light in the plane of the input area to produce a second grid of light beams;

and said second grid of light beams traverses the input area in a second direction, different to the first direction, and is directed to the light detecting elements of said light detector by a fourth set of waveguides with associated fourth set of slab regions of said waveguide structure.

Preferably, the third set of waveguides with associated third set of slab regions sends beams of light across the input area towards corresponding waveguides of the fourth set of waveguides with associated fourth set of slab regions.

Preferably, said input area is quadrilateral, said first and third sets of waveguides with associated first and third sets of slab regions are arranged along adjacent first and third edges of the input area, and said second and fourth sets of waveguides with associated second and fourth sets of slab regions are arranged along adjacent second and fourth edges of the input area.

More preferably, said input area is rectangular, and the second direction is substantially perpendicular to the first direction. More preferably, the end faces of the first, second, third and fourth sets of slab regions associated with the first, second, third and fourth sets of waveguides terminate are substantially parallel to the corresponding edges of the input area. More preferably the first direction is substantially perpendicular to the first and second edges of the input area, and the second direction is substantially perpendicular to the third and fourth edges of the input area.

Preferably, a user provides input to the electronic device by interacting with the input area. More preferably, the user interacts with the input area with a finger or stylus.

Preferably, said waveguide structure is a photolithographically defined structure.

Preferably, said first material is a dielectric material. More preferably, the dielectric material is a polymer.

In one embodiment the input device additionally comprises first and second external lenses proximate to the ends of the first and second sets of slab regions associated with the first and second sets of waveguides, to collimate the first grid of light beams in the direction perpendicular to the input area plane.

In a further embodiment, the input device additionally comprises third and fourth external lenses proximate to the ends of the third and fourth sets of slab legions associated with the third and fourth sets of waveguides, to collimate the second grid of light beams in the direction perpendicular to the input area plane.

In a further embodiment the input device additionally comprises:

first and second external lenses proximate to the ends of the first and second sets of slab regions associated with the first and second sets of waveguides, to collimate the first grid of light beams in the direction perpendicular to the input area plane; and third and fourth external lenses proximate to the ends of the third and fourth sets of slab regions associated with the third and fourth sets of waveguides, to collimate the second grid of light beams in the direction perpendicular to the input area plane, wherein the end faces of the first, second, third and fourth sets of slab regions associated with the first, second, third and fourth sets of waveguides are located in the focal planes of the first, second, third and fourth external lenses.

Preferably, the input device additionally comprises a transparent material between the ends of the first, second, third and fourth sets of slab regions and the first second, third and fourth external lenses. More preferably, the transparent material has refractive index substantially equal to the refractive index of said first material.

Preferably, said transparent material is an adhesive, to attach each external lens to its respective set of waveguides with associated slab regions. More preferably, said transparent material has refractive index substantially equal to the refractive index of said first material.

Advantageously, optical elements according to at least a preferred embodiment of the present invention are more mechanically robust, easier to incorporate into the touch screen assembly and are less susceptible to stray light and the ingress of foreign matter.

BRIEF DESCRIPTION OF DRAWINGS

The invention will now be described, by way of example only, with reference to the accompanying drawings in which:

FIGS. 2a (plan view) and 2b (side view) show the positioning of a vertical collimating lens with respect to the end face of a conventional transmit element;

FIGS. 12*a* (plan view) and 12*b* (side view) show the positioning of a vertical collimating lens with respect to the end face of a transmit element according to a first embodiment of the invention.

DETAILED DESCRIPTION OF THE INVENTION

Figure 1:
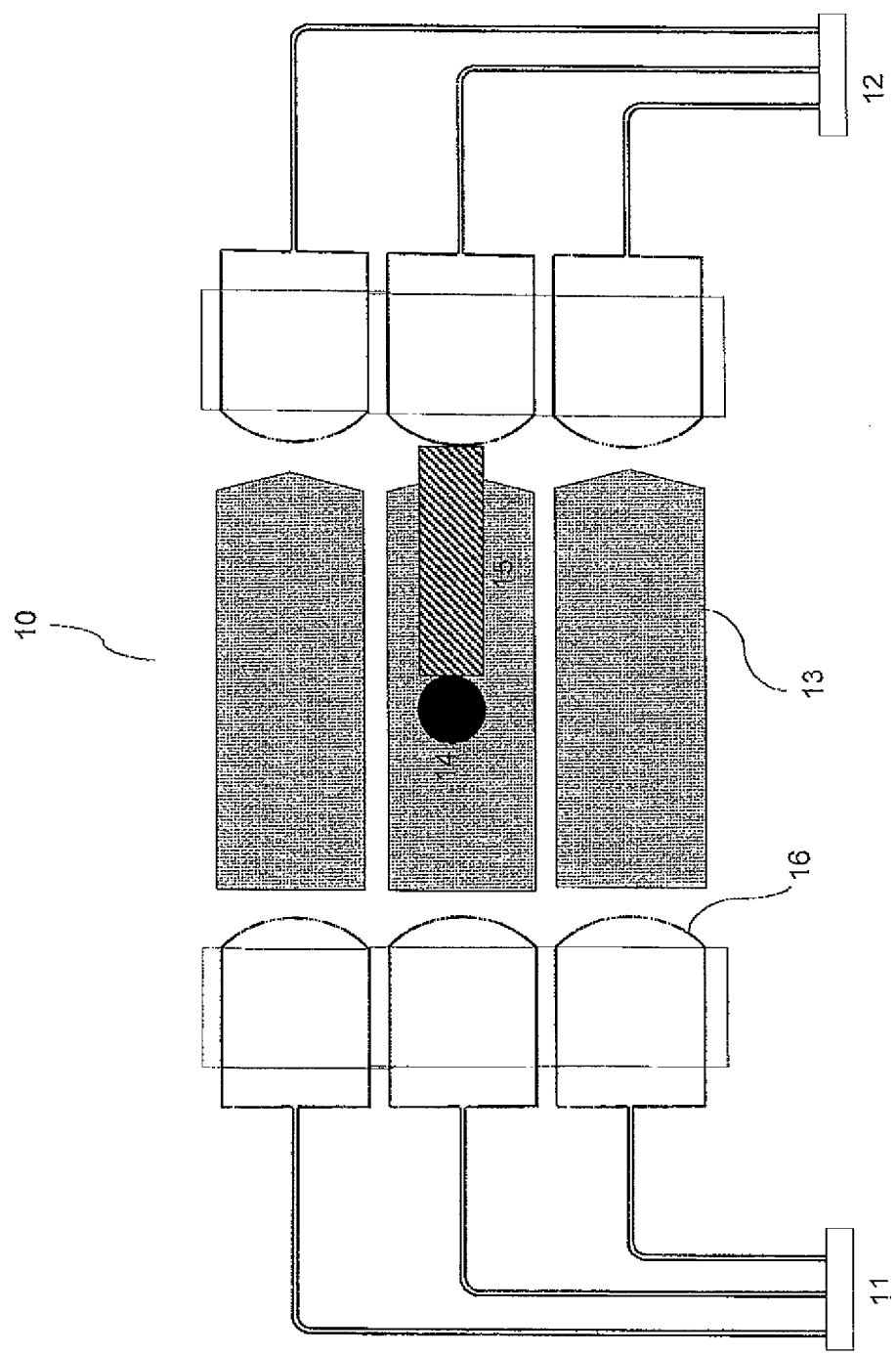
FIG. 1 illustrates the operation of a waveguide-based optical touch screen sensor incorporating lenses to provide in-plane focusing of the light beams.

The waveguide-based optical touch screen sensor technology disclosed in U.S. Pat. Nos. 5,914,709, 6,181,842 and 6,351,260, and U.S. Patent Application Nos. 2002/0088930 A1 and 2004/0201579 A1, has potential application to a variety of consumer electronics devices, including mobile phones, computers, games, and personal digital assistants (PDAs). To be acceptable for such devices, it is essential that the various components be fabricated and assembled at an acceptable cost. Compared to an approach with paired arrays of optical sources and detectors, as disclosed for example in U.S. Pat. Nos. 3,764,813 and 4,301,447, this waveguide-based technology requires only one optical source and one detector, providing a significant cost advantage. With the waveguides and associated collimating optics being the enabling components of this touch screen sensor technology, it is essential to be able to mass produce them in a low cost manner, a requirement that can only be satisfied with polymer materials. Photo-patternable polymers that can be processed using a photolithography/wet development method are particularly preferred because of the ease and mild conditions (eg UV exposure followed by solvent development) by which they can be patterned, and the relatively low cost of the processing equipment.

Examples of photo-patternable polymers include acrylates and siloxanes. One particularly suitable class of materials is UV curable siloxane polymers, synthesised for example by a condensation reaction as disclosed in U.S. Pat. Nos. 6,800, 724 and 6,818,721 (each of which is incorporated herein by reference in its entirety). Siloxane polymers have excellent adhesion to a variety of substrate materials, including silicon, glass and plastics. A photoinitiator or thermal initiator may be added to increase the rate of curing. Examples of commercially available photoinitiators include 1-hydroxy-cyclohexyl-phenyl-ketone (Irgacure 184), 2-methyl-1[4-methylthio)phenyl]-2-morpholinopropan-1-one (Irgacure 907), 2,2-dimethoxy-1,2-diphenylethan-1-one (Irgacure 651), 2-benzyl-2-dimethylamino-1-(4-morpholinophenyl)-butanone-1 (Irgacure 369), 4-(dimethylamino)benzophenone, 2-hydroxy-2-methyl-1-phenyl-propan-1-one (Darocur 1173), benzophenone (Darocur BP), 1-[4-(2-hydroxyethoxy)-phenyl]-2-hydroxy-2-methyl-1-propane-1-one (Irgacure 2959), 4,4'-bis(diethylamino) benzophenone (DEAB), 2-chlorothioxanthone, 2-methylthioxanthone, 2-isopropylthioxanthone, benzoin and 4,4'-dimethoxybenzoin. For curing with visible light, the initiator may for example be camphorquinone. A mixture of two or more photoinitiators may also be used. For example, Irgacure 1000 is a mixture of 80% Darocur 1173 and 20% Irgacure 184. For thermal curing, organic peroxides in the form of peroxides (eg dibenzoyl peroxide), peroxydicarbonates, peresters (t-butyl perbenzoate), perketals, hydroperoxides, as well as AIBN (azobisisobutyronitrile), may be used as initiators.

Other additives, such as stabilisers, plasticisers, contrast enhancers, dyes or fillers may be added to enhance the properties of the polymer as required.

Thin films of polymer material suitable for waveguide fabrication by photo-patterning can be deposited on a substrate by a variety of methods, including spin coating, dip coating, meniscus coating, extrusion coating and slot coating. These thin films can then be photo-patterned with light either through a mask, for example in a mask aligner or stepper, or by a laser direct writing procedure. Exposure through a mask is generally preferred for high fabrication throughput.

As explained previously, there are several problems with the existing designs of transmit and receive elements of a waveguide-based optical touch screen sensor. These problems include: incomplete collimation in the vertical plane that may allow stray light to enter the receive optics; difficulty in cutting the substrate with sufficient accuracy for simple butt-placement of a vertical collimating lens; the risk of mechanical damage to the exposed curved end faces; and the fact that an adhesive cannot be placed between the transmit or receive elements and the vertical collimating lenses.

The following section will concentrate on modified designs for the transmit elements, however it will be appreciated that the receive elements are in general mirror images of the transmit elements. Unless stated otherwise, all design modifications for the transmit elements apply equally well to the receive elements.

With reference to FIGS. 2*a* and 2*b*, all of the abovementioned problems are caused by the fact that in the existing design, collimation in the horizontal plane occurs at curved end face 21, which is an optical surface. In the present invention, if the horizontal collimation were to be performed by one or more converging lenses incorporated within the body of the transmit element, the end face could be made straight and butted against the vertical collimating lens. Many classes of converging lenses suitable for planar waveguides are known in the art, including:

geodesic lenses comprising a spheroidal indentation in the waveguide surface ("Geodesic optical waveguide lens analysis", W. H. Southwell, *J. Opt. Soc. Am* 67, 1293-1299 (1977);

Luneburg lenses comprising a shaped overlay of high index material (U.S. Pat. Nos. 4,856,861; 4,979,788);

chirped gratings (U.S. Pat. Nos. 4,262,996; 4,440,468); and

Fresnel lenses of various types (U.S. Pat. Nos. 4,367,916; 4,445,759; "Ion-milled waveguide lenses and lens arrays in GaAs", T. Q. Vu & C. S. Isai, *J. Lightwave Technol.* 7, 1559-1566 (1989)).

In terms of fabrication however, the most convenient converging lenses are simple in-plane convex or concave lenses composed of a transparent material with refractive index different to that of the waveguide material. In-plane lenses that converge or diverge light in planar waveguides are well known in the art, where the lens material has either higher or lower refractive index than the surrounding waveguide ("A new guided-wave lens structure", M. M. Minot and C. C. Lee,

*J. Lightwave Technol.* 8, 1856-1865 (1990); "Design of low-loss tapered waveguides using the telescope structure compensation", C. W. Chang, M. L. Wu and W. F. Hsieh, *IEEE Photon. Technol Lett* 15, 1378-1380 (2003); JP 56078814A; U.S. Pat. Nos. 4,755,014; 5,253,319; 6,980,718; 6,935,764) In the present application, where the transmit elements are composed of polymer, the material used for the lenses must be compatible with the polymer, particularly in terms of processing conditions (eg deposition temperature) Generally, it is preferable for the refractive index contrast to be as large as possible, to minimise the length of the transmit element. It is particularly preferred that the in-plane lens(es) be composed of air, because the refractive index contrast is relatively large (polymer index $n_{polymer}$~1.513, air index $n_{air}$~1), and the processing is simple (no additional processing steps are required). Since the refractive index of air is less than that of polymer, an in-plane converging lens composed of air will be concave (eg bi-concave, piano-concave or meniscus concave) in shape. Alternatively, the in-plane converging lens may be composed of a material of higher refractive index, in which case it will be convex (eg bi-convex, plano-convex or meniscus convex) in shape.

The present invention and U.S. patent application No. 2006/0088244A1 (incorporated by reference in its entirety) both describe in-plane converging lenses included within a slab region, but they differ in that the included lenses of the present invention perform the required collimation of signal light by themselves (so that the slab region has a straight end face), while in U.S. 2006/0088244 A1 the slab region has a curved end face that contributes to the collimation process. It should be understood that the transmit and receive elements of the present invention may also include one or more diverging lenses, as can the transmit and receive elements of U.S. 2006/0088244 A1.

Figure 3:
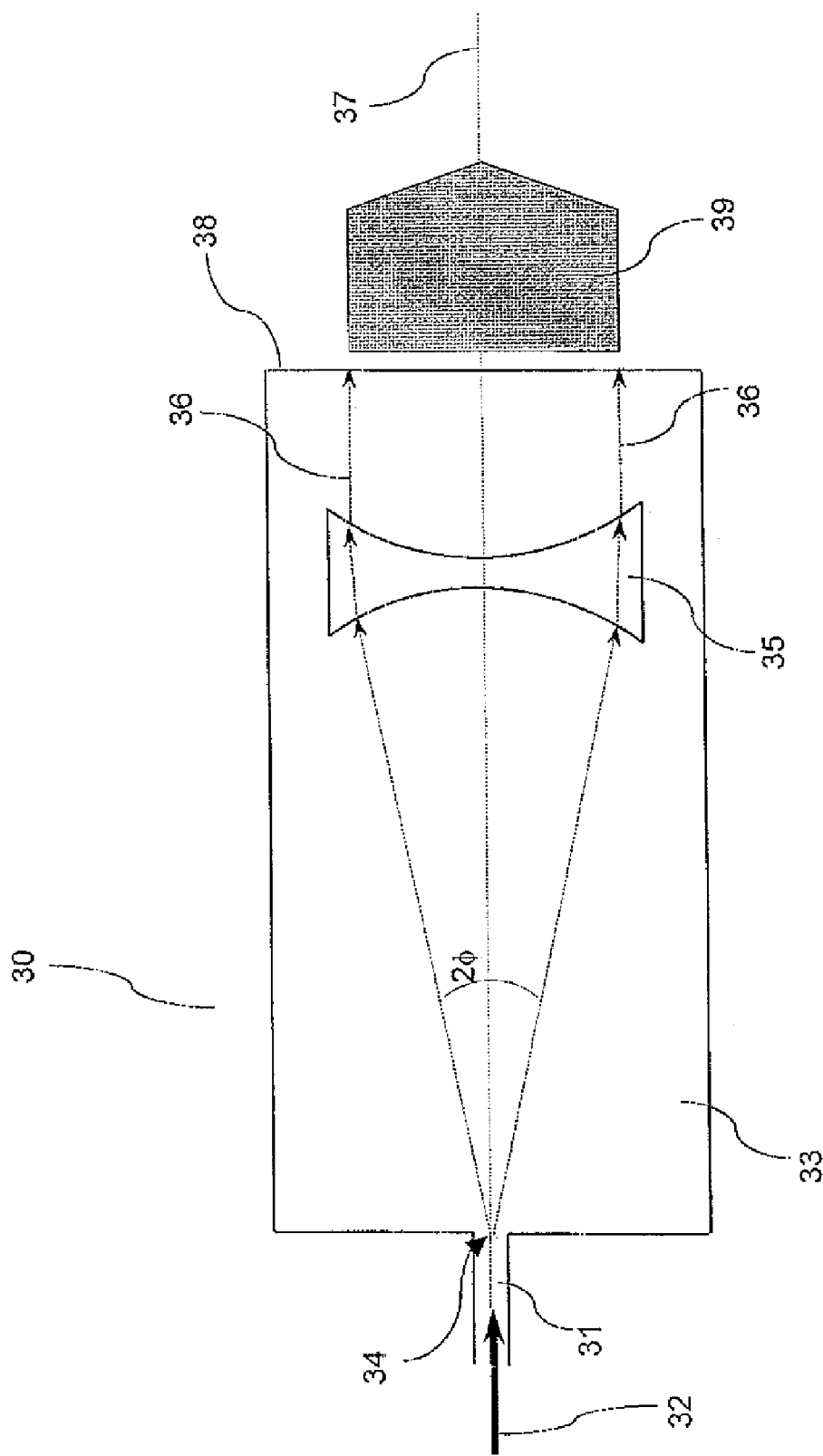
FIG. 3 shows a transmit element containing a converging lens according to a first embodiment of the present invention.

A transmit element 30 incorporating a converging lens according to a first embodiment of the present invention is shown in FIG. 3. Transmit waveguide 31 guides light 32 into polymer slab waveguide region 33 at point 34, whereupon it spreads with divergence angle 2φ and encounters converging lens 35 that collimates the light into rays 36, parallel to optical axis 37, that exit end face 38 to form transmitted plane wave 39. Crucially, end face 38 is straight, and can be readily cut with a dicing saw, laser cutter or the like. End face 38 is also perpendicular to optical axis 37, so that rays 36 encounter it at normal incidence and are not refracted. Preferably, transmit waveguide 31 is symmetrically located with respect to converging lens 35. More preferably, transmit waveguide 31 and converging lens 35 are symmetrically located with respect to polymer slab waveguide region 33. Converging lens 35 can have a variety of shapes, so long as it has sufficient width to capture all light rays within divergence angle 2φ and the correct curvature to collimate the rays along optical axis 37.

Figure 4A:
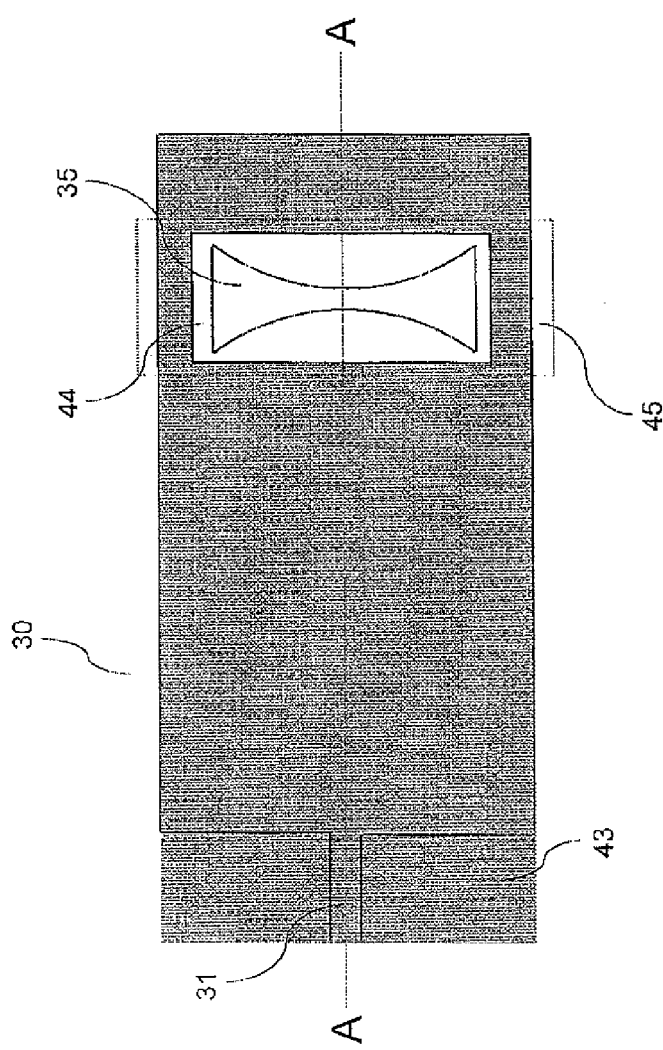
FIGS. 4a (plan view) and 4b (side view) illustrate the fabrication of a transmit element incorporating a converging lens, using photo-patternable polymers.
Figure 4B:
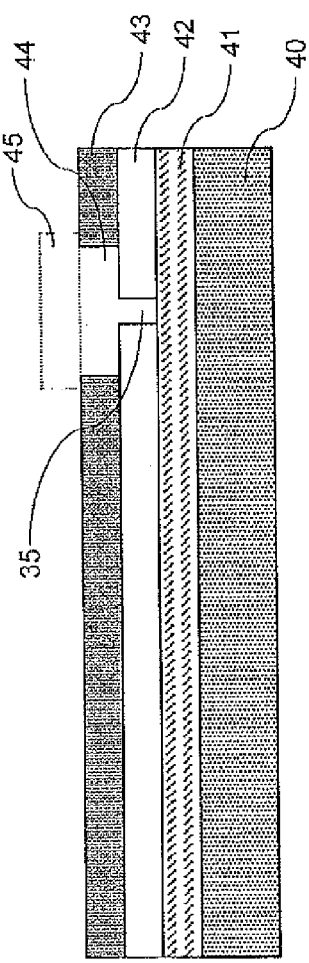

A method for fabricating a transmit element 30 incorporating a converging lens is described in the following non-limiting example, with reference to FIGS. 4a and 4b

EXAMPLE 1

Following the procedure disclosed in U.S. Pat. No. 6,818, 721, a lower refractive index polymer A was prepared with a viscosity of 2500 cP (at 20° C.) and a refractive index (measured at 20° C. on an Abbé refractometer with room light) of 1.483. A higher refractive index polymer B was prepared with a viscosity of 2200 cP (at 20° C.) and a refractive index of 1.509 (at 20° C.). A suitable photoinitiator was added to both polymer A and polymer B Polymer A was spin coated onto silicon wafer 40 and cured with UV light from a mercury lamp, to form lower cladding layer 41 with thickness 20 μm and refractive index 1.485 (at 20° C. and 850 nm). Polymer B was spin coated onto lower cladding layer 41 to form core layer 42, and patterned with UV light through a mask. The unexposed polymer B material was then dissolved in isopropanol to form input waveguide 31 and transmit element 30 incorporating converging lens 35 composed of air. Exposed core layer 42 had thickness of 11 μm and a refractive index of 1.513 (at 20° C. and 850 nm). Finally, a protective upper cladding layer 43 was deposited by spin coating and UV curing a second layer of polymer A. Note that it is necessary to pattern upper cladding layer 43 in the same manner as for the core layer (as disclosed in U.S. patent application No. 2005/0089298 A1), to avoid in-filling converging lens 35 with cured polymer A. Although converging lens 35 is filled temporarily with uncured polymer A, this material is removed in the subsequent development step. The exact positioning of opening 44 in patterned upper cladding layer 43 is not particularly important, so long as converging lens 35 remains uncovered. If additional mechanical protection is required, a cover plate 45 may be fixed above converging lens 35, however this may not be necessary since in the assembled touch screen sensor; transmit element 30 will generally be located within the bezel of the screen.

It will be appreciated that if converging lens 35 is composed of air, no additional process steps are required to incorporate it within transmit element 30. It requires nothing more than a modification of the core layer and upper cladding layer mask designs, and is therefore preferred for ease of fabrication. It would be possible however, at the expense of additional process steps, to fill converging lens 35 with some other curable polymer C, with refractive index significantly different from polymer B, either before or after upper cladding layer 43 is deposited and patterned. It will be further appreciated that, with appropriate mask design, a lens 35 of virtually any shape can be incorporated within transmit element 30.

All subsequent examples describe exemplary transmit elements fabricated by the process described in Example 1. Unless stated otherwise, input waveguide 31 has a width of 8 μm and a height of 11 μm. With these dimensions, and with a relatively large core/cladding refractive index difference (ie difference between refractive indices of cured polymers A and B) of 0.028, it will be appreciated by those skilled in the art that input waveguide 31 will be multi-moded (ie it will support several optical modes) at a typical operating wavelength of 850 nm. These parameters also fix the divergence angle 2φ, which is measured experimentally to be approximately 16°.

The following two non-limiting examples describe transmit elements 30 according to a first embodiment of the invention, where a single included converging lens 35 composed of air is used to collimate the transmit light into a plane wave (as shown in FIG. 3). The elements are designed for a wavelength of 850 nm, and for simplicity a geometrical ray optics approach is used in these and all subsequent examples, ie point 34 (where light 32 from input waveguide 31 enters slab waveguide region 33) is assumed to be a point source, and the diverging light rays are assumed to form a spherical wavefront within slab region 33. In practice, the finite width and (generally) multimode nature of input waveguide 31 results in a complex wavefront, however this does not affect the essence of the invention.

EXAMPLE 2

Figure 5:
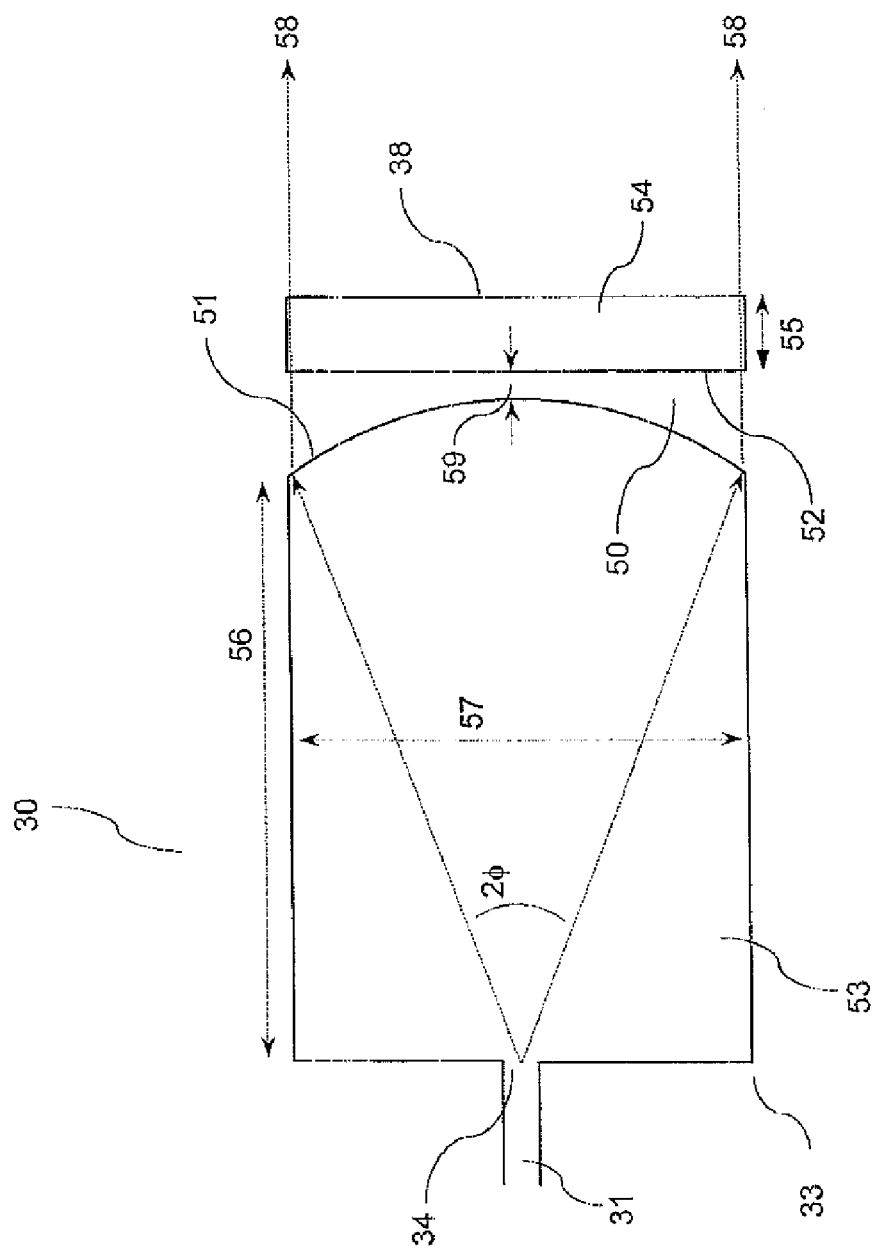
FIG. 5 shows a transmit element according to the first embodiment of the invention, containing a piano-concave lens composed of air.

FIG. 5 shows a transmit element 30 according to the first embodiment of the invention, containing a plano-concave lens 50 comprising a concave front surface 51 and a planar back surface 52. In this example, plano-concave lens 50 is composed of air and extends across the full width of polymer slab waveguide region 33, thereby splitting it into first slab waveguide region 53 and second slab waveguide region 54. Such a design may be advantageous for a wet development fabrication process, to aid the passage of solvent and the removal of unexposed material. It will be appreciated that second slab waveguide region 54 allows end face 38 to be straight but has no focusing function, and can therefore be of any length. For example it may be made arbitrarily short to minimise the overall length of transmit element 30. In practice, second slab waveguide region 54 should have a length 55 of at least 30 μm, to allow sufficient margin for the dicing process that forms end face 38. To minimise the overall length, gap 59 between first slab waveguide region 53 and second slab waveguide region 54 should be made as small as possible within the limits of the fabrication process. For example, with photo-patternable polymers processed using a photolithography/wet development method, gap 59 should be at least 5 to 10 μm. Note that with other materials and/or other photolithography tools, gap 59 could possibly be made smaller. First slab waveguide region 53 has length 56 of 2670 μm and width 57 of 750 μm, chosen such that light diverging in first waveguide slab region 53 within angle $2\phi=16°$ will fill concave front surface 51. It is a well known result of geometrical optics ("Optics", E. Hecht, $2^{nd}$ ed, Addison-Wesley (1987), p. 129-132) that if light rays emanating from a point source in a medium of higher refractive index $n_2$ pass into a medium of lower refractive index $n_1$ through an ellipsoidal interface, they will emerge perfectly collimated provided the interface is a portion of an ellipse chosen such that its eccentricity is equal to $n_1/n_2$ and the point source is located at its farther focus. In the present case therefore, concave front surface 51 needs to be a portion of an ellipse with eccentricity=$n_{air}/n_{core}$~1/1.513 and with farther focus at point 34.

Figure 6:
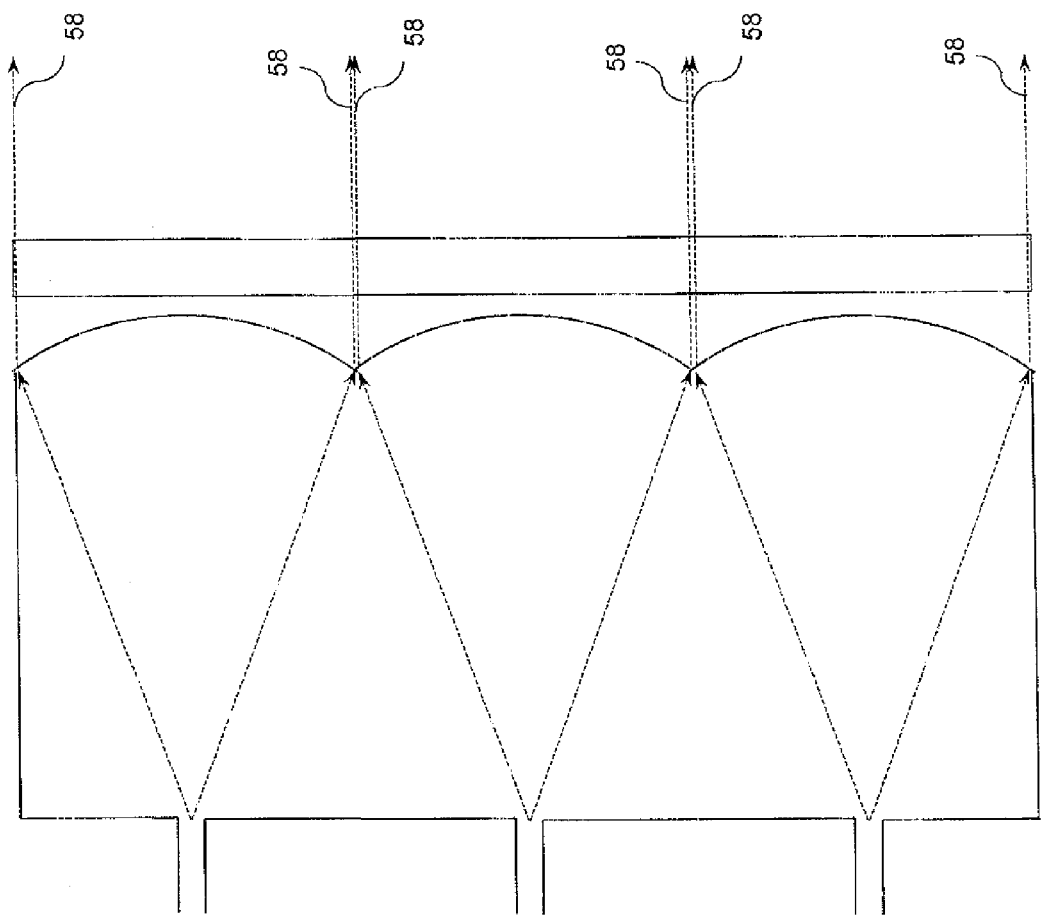
FIG. 6 illustrates the emission of a sheet of light from an array of adjacent transmit elements.

With this particular design of first slab waveguide region 53 and plano-convex lens 50, collimated light rays 58 will be emitted from the entire width of second slab waveguide region 54, so that when several transmit elements are placed adjacent to each other in an array, as shown in FIG. 6, they will emit an essentially uninterrupted sheet of light U.S. patent application No. 200410201579 A1 teaches that this type of output is preferable for an optical touch screen sensor since, compared to an alternative configuration with discrete beams separated by considerable dark regions, a sheet of light minimises the required dynamic range of the photodetectors associated with the X, Y receive arrays, enhances the grey scale interpolation of the position sensing algorithms, and minimises the chance that a thin touching object could be missed by the beams. A configuration with discrete beams also complicates the manufacturing process, because the receive side waveguides need to be critically aligned (in the horizontal plane) with the transmit side waveguides, whereas with a sheet of light, the horizontal positioning of the receive side waveguides is non-critical.

Nevertheless, other considerations may indicate that a sheet of light is not the optimal configuration. For example, as pointed out in U.S. Patent Application No. 2006/0188196 A1 (incorporated herein by reference in its entirety), polymer materials typically have large thermo-optic coefficients (ie their refractive index varies significantly with ambient temperature) and so the refraction at lens surface 51 (governed by Snell's law) will be temperature dependent. Therefore while an elliptical concave front surface 51 of plano-concave lens 50 will collimate the light perfectly at one particular temperature, it will not do so at any other temperature, representing a source of optical power loss and possible cross-talk into adjacent receive elements. To allow for this temperature effect, it may be preferable to have a smaller "fill factor" for each transmit element, so that only some fraction of plano-concave lens 50 is illuminated by light diverging within first slab waveguide region 53.

EXAMPLE 3

Figure 7:
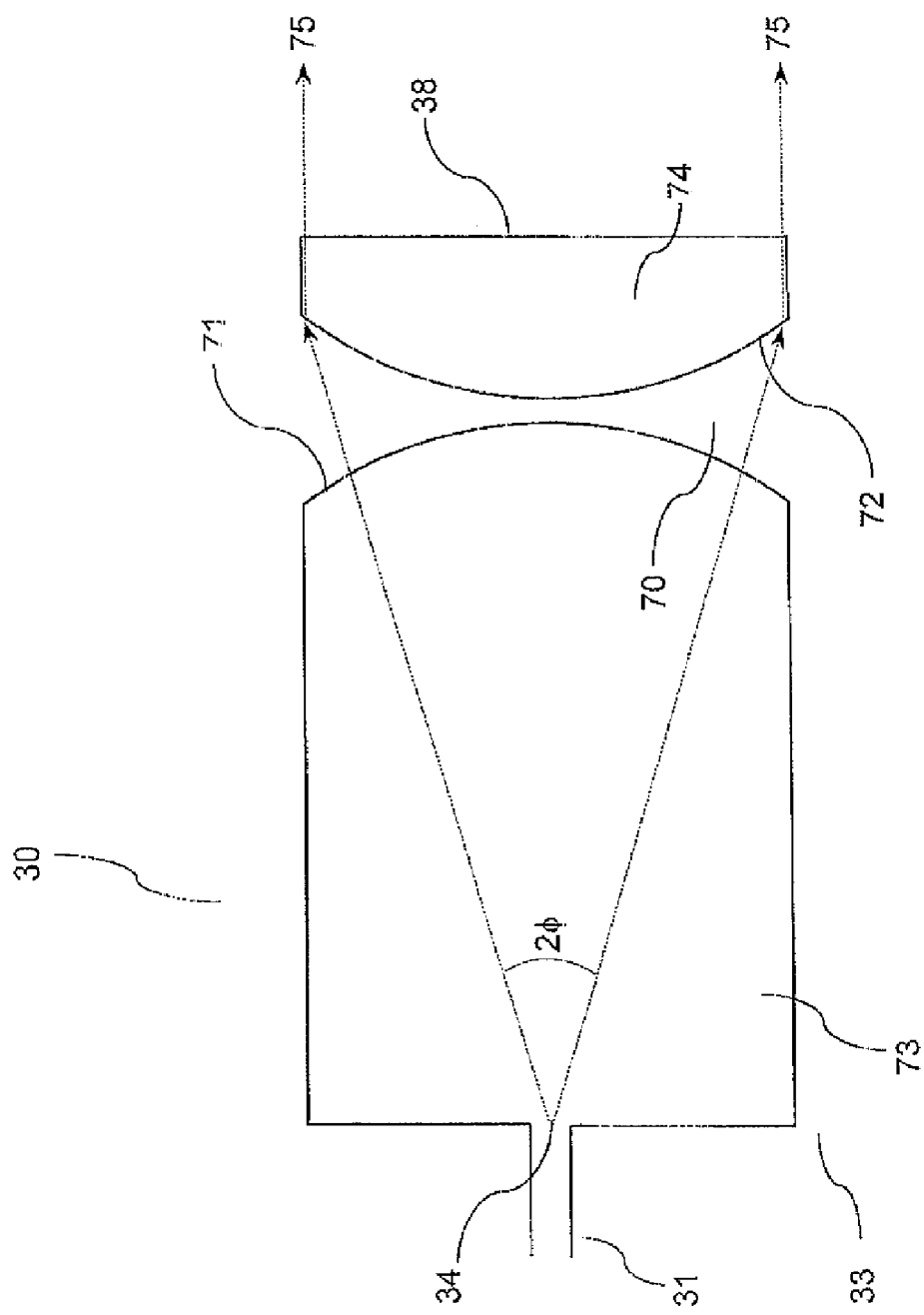
FIG. 7 shows another transmit element according to the first embodiment of the invention, containing a bi-concave lens composed of air.

FIG. 7 shows another transmit element 30 according to a first embodiment of the invention, containing bi-concave lens 70 composed of air and comprising concave front surface 71 and concave back surface 72. Bi-concave lens 70 extends across the full width of polymer slab waveguide region 33, splitting it into first slab waveguide region 73 and second slab waveguide region 74. Concave front surface 71 is designed to be an are of a circle centred on point 34, so that light rays emanating from this point encounter front surface 71 at normal incidence and pass through without being refracted. The light rays then encounter concave back surface 72, which is designed to collimate them into output rays 75. In another well known result of geometrical optics ("Optics", E. Hecht, $2^{nd}$ ed, Addison-Wesley (1987), p. 129-132), if light rays emanating from a point source in a medium of lower refractive index $n_1$ pass into a medium of higher refractive index $n_2$ through a hyperboloidal interface, they will emerge perfectly collimated provided the interface is a portion of a hyperbola chosen such that its eccentricity is equal to $n_2/n_1$ and the point source is located at its farther focus. In the present case therefore, concave back surface 72 needs to be a portion of a hyperbola with eccentricity=$n_{eff}/n_{air}$ and farther focus at point 34, where $n_{eff}$ is the effective refractive index of the polymer/air path between point 34 and surface 72.

Figure 8:
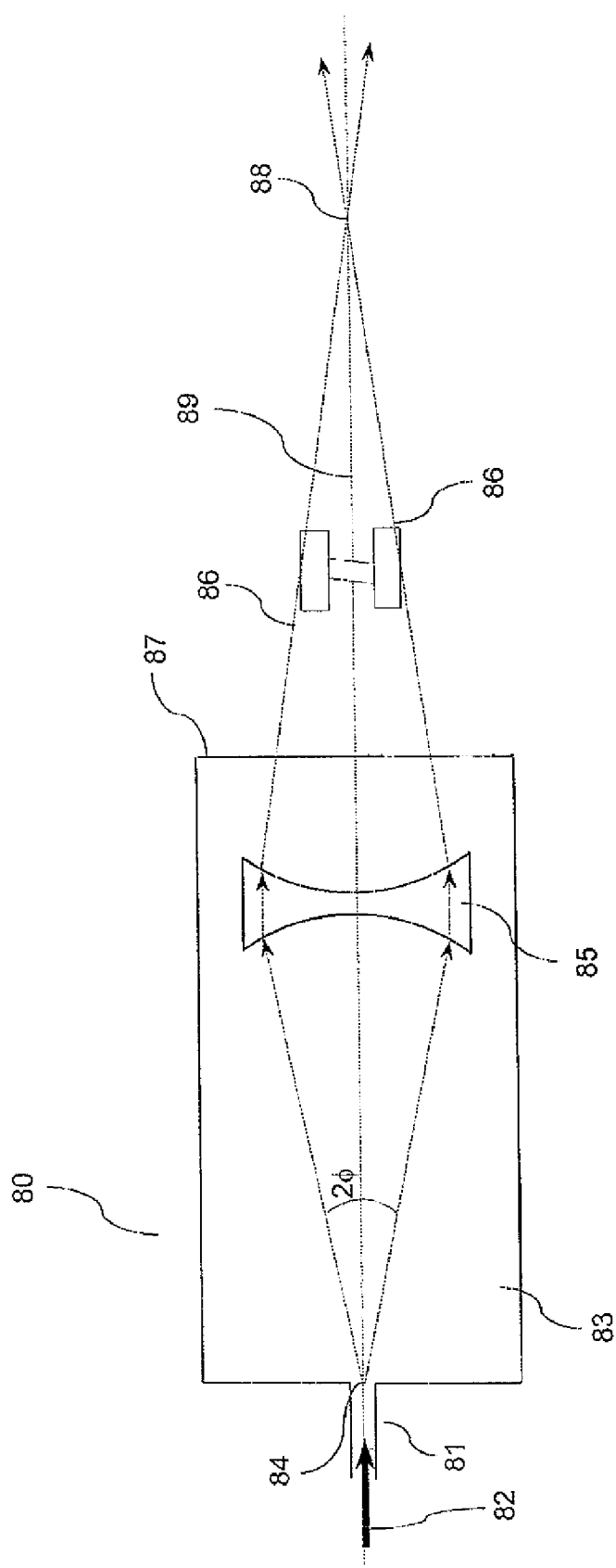
FIG. 8 shows a transmit element containing a converging lens according to a second embodiment of the invention.
Figure 9:
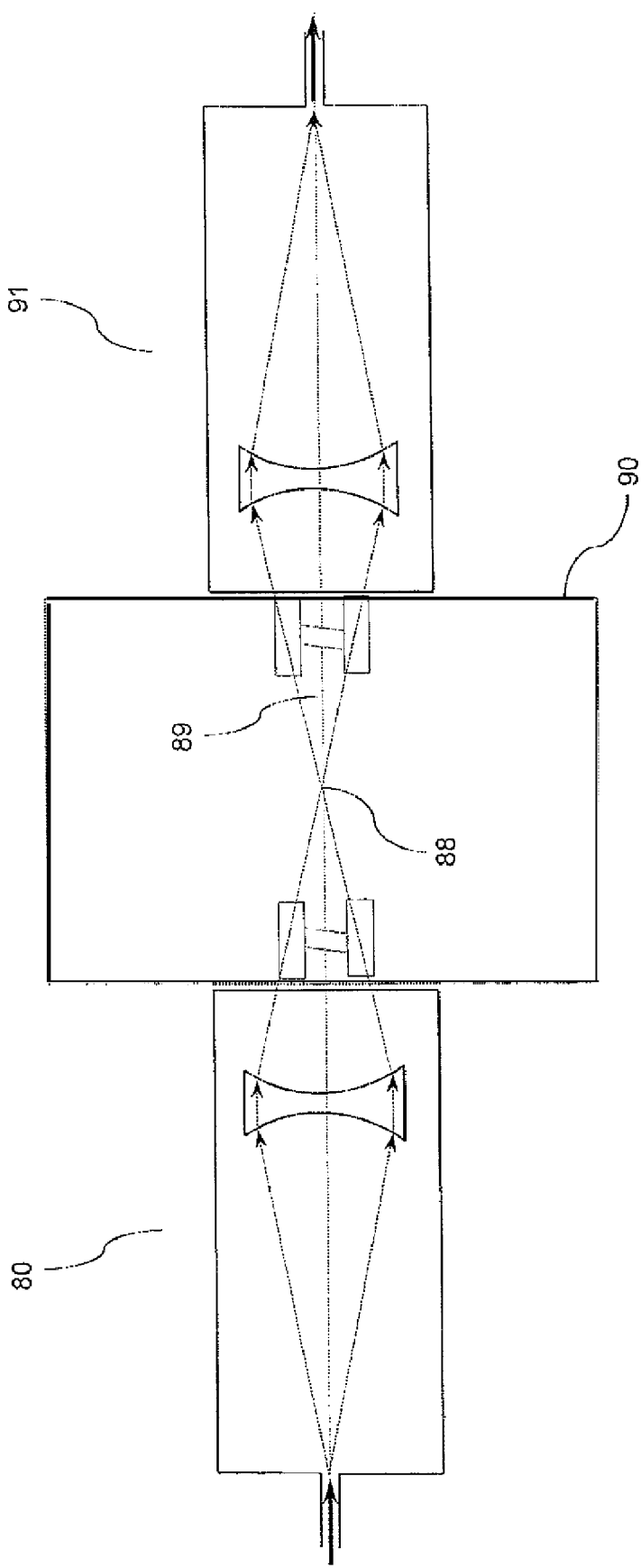
FIG. 9 shows a pair of transmit and receive elements, each containing a converging lens according to the second embodiment of the invention.

A transmit element 80 incorporating a converging lens according to a second embodiment of the present invention is shown in FIG. 8. Transmit waveguide 81 guides light 82 into polymer slab waveguide region 83 at point 84, whereupon it spreads with divergence angle $2\phi$ and encounters converging lens 85 that focuses the light into rays 86 that exit end face 87 and converge to an external point 88. Preferably, as shown in FIG. 9, external point 88 is located on optical axis 89, midway across screen area 90. This symmetrical arrangement retains several preferred aspects of the first embodiment, where receive element 91 is the mirror image of transmit element 80 and each receive element is paired with a transmit element. Since the width of a touch screen is typically of order 100 mm whereas the length of transmit element 80 is of order 1 mm, the distance from point 84 to converging lens 85 is approximately two orders of magnitude smaller than the distance from converging lens 85 to external point 88. Compared with the first embodiment, this second embodiment may be advantageous because it may be more resilient to temperature-induced variations in the polymer refractive index, as discussed above in Example 2 and in U.S. Patent Application No. 2006/0188196 A1. Specifically, temperature changes will move the focal point (ie the image) to and fro slightly across the screen, but will not cause a large variation in the amount of light captured at the receive elements.

EXAMPLE 4

Figure 10:
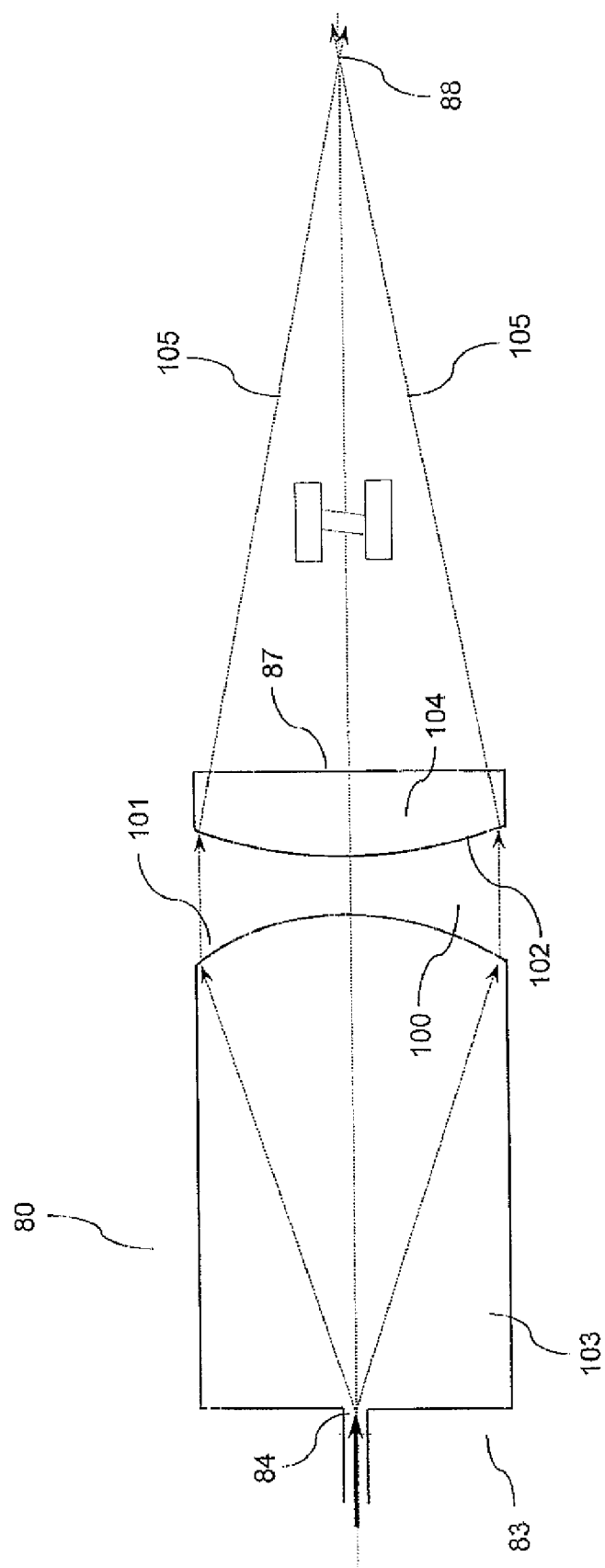
FIG. 10 shows a transmit element according to the second embodiment of the invention, containing a biconcave lens composed of air.

FIG. 10 shows transmit element 80 according to the second embodiment of the present invention, containing a bi-concave lens 100 composed of air and comprising a concave front surface 101 and a concave back surface 102. Bi-concave lens 100 extends across the full width of polymer slab waveguide region 83, splitting it into first slab waveguide region 103 and second slab waveguide region 104. Concave front surface 101 is ellipsoidal in shape, comprising a portion of an ellipse with eccentricity=$n_{air}/n_{core}$~1/1.513 and with farther focus at point 84. Concave back surface 102 is also ellipsoidal in shape, comprising a portion of an ellipse with eccentricity=$n_{air}/n_{core}$~1/1.513 but with farther focus at external point 88. It will be appreciated that the local curvature of concave back surface 102 is much smaller than the local curvature of concave front surface 101, since its farther focus is much more distant.

It should be noted that light rays 105 are no longer perpendicular to end face 87, and will therefore be refracted there. However since the angle of incidence will be extremely close to zero, this additional refraction will be small and can be compensated for (if required) with a minor adjustment to the shape of bi-concave lens 100.

Figure 11:
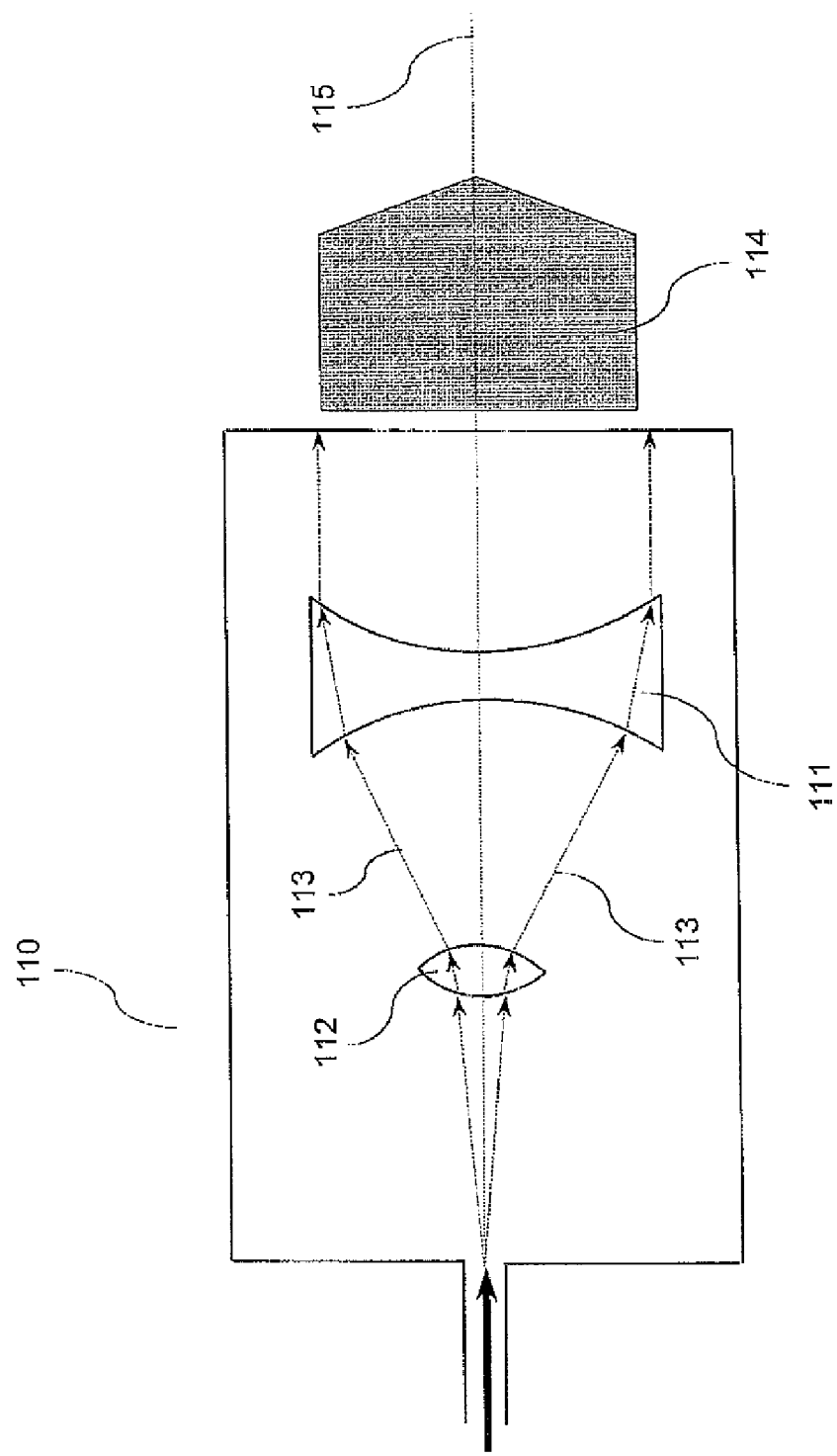
FIG. 11 shows a transmit element according to a third embodiment of the invention, containing a converging lens and a diverging lens.

A transmit element 110 according to a third embodiment of the present invention is shown in FIG. 11. In this case, in addition to the converging lens 111, transmit element 110 also contains a diverging lens 112. Those skilled in the art will recognise that diverging lens 112 and converging lens 111 are positioned in a beam expander configuration, described for example by Chang et al ("Design of low-loss tapered waveguides using the telescope structure compensation", *IEEE Photon Technol. Lett.* 15, 1378-1380 (2003)) As disclosed in U.S. Patent Application No. 2006/0088244 A1, diverging lens 112 serves to increase the divergence angle of light within transmit element 110, thereby reducing its overall length. As illustrated in FIG. 11, converging lens 111 is designed to collimate diverging rays 113 into plane wave 114 propagating parallel to optical axis 115 in the same manner as in the first embodiment of the present invention. Alternatively, converging lens 111 could be designed to focus diverging rays 113 to an external point on optical axis 115 in the same manner as in the second embodiment of the present invention.

The advantages of the transmit and receive elements of the present invention over those of the prior art will now be explained, with reference firstly to FIGS. 12a and 12b which show an assembly of a transmit element 30 according to the first embodiment and a vertical collimating lens (VCL) 23, and secondly to FIGS. 2a and 2b which show an assembly of a conventional transmit element 20 and a VCL 23. For clarity, the upper cladding layer has been omitted from FIGS. 12a and 12b. A first advantage is that end face 38 is butted directly against VCL 23, eliminating any gap 27 between them VCL 23 and transmit element 30 will both be bonded to common base 28, and preferably also bonded to each other at the interface between end face 38 and VCL face 120. Preferably, the applied transparent adhesive has refractive index substantially similar to that of core layer 42, to minimise reflection losses. More preferably, the refractive indices of core layer 42, VCL 23 and the transparent adhesive are all substantially similar. Alternatively, an index matching fluid can be placed at the interface between end face 38 and VCL face 120.

A second advantage is that the whole of end face 38 can be placed at the focal plane 22 of VCL 23, so that emitted light rays 121 are perfectly collimated in the vertical plane, preventing out-of-plane stray light from being emitted from transmit element 30 or from entering the corresponding receive element. Those skilled in the art will understand that when light 122 propagating through cove layer 42 traverses converging (air) lens 35, the lack of vertical confinement will result in some out-of-plane divergence, represented by ray 123. However such rays will be blocked by screen bezel 124 or by lower cladding layer 41 and substrate 40, and therefore will not be a source of stray light to the receive optics.

A third advantage is that in the assembly process, end face 38 of transmit element 30 is automatically located at the focal plane 22 of VCL 23. This is in contrast to the situation shown in FIG. 2a, where gap 27 is a critical dimension that depends on the accuracy of the dicing process.

It will be appreciated that all of these advantages stem from the feature that end face 38 of transmit element 30 is no longer a refractive surface, and can instead be made straight and perpendicular to optical axis 37. This feature is shared by transmit elements 80 and 110 of the second and third embodiments and by the receive elements that are generally mirror images of the transmit elements.

Those skilled in the art will realise that if the in-plane lenses preferred in the present invention are composed of a lower refractive index material, and in particular air, some degree of out-of-plane optical loss will occur due to reduced vertical confinement as light traverses the lenses. By way of illustration, in the piano-concave air lens structure of Example 2 shown in FIG. 5, the spacing between first slab waveguide region 53 and second slab waveguide region 54 will be approximately 85 μm at the extremities, assuming a gap 59 of 10 μm. The optical loss can be estimated by assuming a single Gaussian mode diverging out of a slab waveguide (first slab waveguide region 53) into free space, and calculating its overlap with a second slab waveguide (second slab waveguide region 54) after traversing a gap of a certain length. For the waveguide parameters used in this specification (wavelength 850 nm and slab height of 11 μm), the loss is estimated to be 0.016 dB after a 10 μm gap and 1.1 dB after an 85 μm gap.

While a 1.1 dB (ie ~23%) out-of-plane loss is not ideal, it is believed to be acceptable considering the simplicity and cost-effectiveness of fabricating basic in-plane concave air lenses. There are of course many means for avoiding the out-of-plane loss, using other types of converging lenses that are all within the scope of this invention. One approach would be to construct the in-plane lenses from a material with higher refractive index than the slab. Another approach would be to fabricate an air lens with a more complicated shape, such as a Fresnel lens or a chirped grating, where the air gap is shorter. Yet another approach would be to use a geodesic lens or an overlay-type lens such as a Luneburg lens or an overlay-type Fresnel lens. Compared to a simple in-plane air lens, however, all of these alternatives require further fabrication process steps, and many of them are complicated structures that require an extremely high degree of fabrication precision.

Although the invention has been described with reference to specific examples it will be appreciated by those skilled in the art that the invention may be embodied in many other forms.

The invention claimed is:

1. An input device for an electronic device comprising:
at least one light source;
at least one light detector to detect light intensity at a plurality of light detecting elements;
an input area defining a plane; and
a waveguide structure including a plurality of waveguides with associated slab regions composed of a first material with first refractive index, each slab region providing a planar extension of its associated waveguide, wherein:
each of said associated slab regions has a substantially straight end face, and at least one converging lens located within;

said light source couples light into a first set of waveguides with associated first set of slab regions of said waveguide structure;
said first set of waveguides directs the light into said associated first set of slab regions;
said converging lenses focus the light in the plane of the input area to produce a first grid of light beams;
said first grid of light beams traverses the input area in a first direction and is directed to the light detecting elements of said light detector by a second set of waveguides with associated second set of slab regions of said waveguide structure; and
each light beam is focused to a point located within said input area.

2. An input device according to claim 1, wherein said converging lens is composed of a second material with refractive index different to that of said first material, and is selected from a group consisting of: a Luneburg lens, a Fresnel lens, a chirped grating, an in-plane lens or a combination thereof.

3. An input device according to claim 2, wherein said converging lens is an in-plane lens, and wherein said converging lens is composed of a second material with refractive index less than the refractive index of said first material, and is bi-concave, plano-concave or meniscus concave in shape.

4. An input device according to claim 3, wherein said second material is air.

5. An input device according to claim 1, wherein each associated slab region additionally contains at least one diverging lens.

6. An input device according to claim 5, wherein each associated slab region contains one diverging lens and one converging lens in a beam expander configuration.

7. An input device for an electronic device comprising:
at least one light source;
at least one light detector to detect light intensity at a plurality of light detecting elements;
an input area defining a plane; and
a waveguide structure including a plurality of waveguides with associated slab regions composed of a first material with first refractive index, each slab region providing a planar extension of its associated waveguide, wherein:
each of said associated slab regions has a substantially straight end face, and at least one converging lens located within;
said light source couples light into a first set of waveguides with associated first set of slab regions of said waveguide structure;
said first set of waveguides directs the light into said associated first set of slab regions;
said converging lenses focus the light in the plane of the input area to produce a first grid of light beams;
said first grid of light beams traverses the input area in a first direction and is directed to the light detecting elements of said light detector by a second set of waveguides with associated second set of slab regions of said waveguide structure;
said light source couples light into a third set of waveguides with associated third set of slab regions of said waveguide structure;
said third set of waveguides directs the light into said associated third set of slab regions;
said converging lenses focus the light in the plane of the input area to produce a second grid of light beams;
said second grid of light beams traverses the input area in a second direction, different to the first direction, and is directed to the light detecting elements of said light detector by a fourth set of waveguides with associated fourth set of slab regions of said waveguide structure; and
each light beam is focused to a point located within said input area.

8. An input device according to claim 7, wherein said input area is quadrilateral, said first and third sets of waveguides with associated first and third sets of slab regions are arranged along adjacent first and third edges of the input area, and said second and fourth sets of waveguides with associated second and fourth sets of slab regions are arranged along adjacent second and fourth edges of the input area, wherein the input area is rectangular, and the second direction is substantially perpendicular to the first direction, and wherein the end faces of the first, second, third and fourth sets of slab regions associated with the first, second, third and fourth sets of waveguides are substantially parallel to the corresponding edges of the input area.

9. An input device according to claim 8, additionally comprising:
first and second external lenses proximate to the ends of the first and second sets of slab regions associated with the first and second sets of waveguides, said first and second external lenses adapted to collimate the first grid of light beams in the direction perpendicular to the input area plane; and
third and fourth external lenses proximate to the ends of the third and fourth sets of slab regions associated with the third and fourth sets of waveguides, said third and fourth external lenses adapted to collimate the second grid of light beams in the direction perpendicular to the input area plane, wherein the end faces of the first, second, third and fourth sets of slab regions are located in the focal planes of the first, second, third and fourth external lenses.

10. An input device according to claim 9, additionally comprising a transparent material between the ends of the first, second, third and fourth sets of slab regions and the first, second, third and fourth external lenses, wherein said transparent material is an adhesive, for attaching each external lens to its respective set of waveguides and associated slab regions, wherein said transparent material has a refractive index substantially equal to the refractive index of said first material.

11. An input device for an electronic device, said input device comprising:
an input area;
a slab waveguide formed from a first material, said slab waveguide having a first end and a second end and having a converging lens located therein;
an optical waveguide having a distal end and a proximal end, said proximal end being in optical communication with said first end of said slab waveguide, wherein said second end of said slab waveguide is straight and substantially parallel to a side of said input area; and
an optical source in optical communication with said distal end of said optical waveguide, the arrangement being such that, in use, light from said optical source is guided in said optical waveguide to said slab waveguide, focused in the plane of said input area by said converging lens, and launched across said input area from said second end of said slab waveguide, wherein said converging lens is configured to focus said light to a point within said input area.

12. An input device according to claim 11, wherein said converging lens is formed from a second material with a refractive index different to the refractive index of said first material, and is selected from a group consisting of: a Luneburg lens, a Fresnel lens, a chirped grating, an in-plane lens or a combination thereof.

13. An input device according to claim 12, wherein the second material has refractive index less than said first material.

14. An input device according to claim 13, wherein said second material is air.

15. An input device according to claim 11, wherein said slab waveguide additionally contains a diverging lens.

16. An input device according to claim 15, wherein said diverging lens and said converging lens are in a beam expander configuration.

17. An input device according to claim 11, wherein said optical waveguide is formed from said first material and is integrally formed with said first end of said slab waveguide.

18. An input device according to claim 11, further comprising an external lens for focusing said light in the direction substantially perpendicular to the plane of said input area, said external lens having a longitudinal axis, wherein said external lens is positioned with said longitudinal axis substantially parallel to said second end of said slab waveguide.

19. An input device for an electronic device, said input device comprising:
   an input area;
   a plurality of slab waveguides formed from a first material, each said slab waveguide having a first end and a second end and having a converging lens located therein;
   a like plurality of optical waveguides each having a distal end and a proximal end, said proximal ends being in optical communication with said first ends of corresponding slab waveguides, wherein said second ends of said slab waveguides are straight and substantially parallel to a side of said input area; and
   an optical source in optical communication with said distal ends of said optical waveguides, the arrangement being such that, in use, light from said optical source is guided in said optical waveguides to said slab waveguides, focused in the plane of said input area by said converging lenses, and launched across said input area from said second ends of said slab waveguides, wherein each said converging lens is configured to focus said light to a point within said input area.

20. An input device for an electronic device, said input device comprising:
   an input area;
   a slab waveguide formed from a first material, said slab waveguide having a first end and a second end and having a converging lens located therein;
   an optical waveguide having a distal end and a proximal end, said proximal end being in optical communication with said first end of said slab waveguide, wherein said second end of said slab waveguide is straight and substantially parallel to a side of said input area;
   an optical source adapted to launch light across said input area towards said second end of said slab waveguide; and
   a detector in optical communication with said distal end of said optical waveguide, wherein said converging lens is configured to collect light emanating from a focal point within said input area and focus said light into said optical waveguide, and said optical waveguide guides said light to said detector.

21. An input device according to claim 20, wherein said converging lens is formed from a second material with a refractive index different to the refractive index of said first material, and is selected from a group consisting of: a Luneburg lens, a Fresnel lens, a chirped grating, an in-plane lens or a combination thereof.

22. An input device according to claim 21, wherein the second material has refractive index less than said first material.

23. An input device according to claim 22, wherein said second material is air.

24. An input device according to claim 20, wherein said slab waveguide additionally contains a diverging lens.

25. An input device according to claim 24, wherein said diverging lens and said converging lens are in a beam expander configuration.

26. An input device according to claim 20, wherein said optical waveguide is formed from said first material and is integrally formed with said first end of said slab waveguide.

27. An input device according to claim 20, further comprising an external lens for focusing said light in the direction substantially perpendicular to the plane of said input area, said external lens having a longitudinal axis, wherein said external lens is positioned with said longitudinal axis substantially parallel to said second end of said slab waveguide.

28. An input device for an electronic device, said input device comprising:
   an input area;
   a plurality of slab waveguides formed from a first material, each said slab waveguide having a first end and a second end and having a converging lens located therein;
   a like plurality of optical waveguides each having a distal end and a proximal end, said proximal ends being in optical communication with said first ends of corresponding slab waveguides, wherein said second ends of said slab waveguides are straight and substantially parallel to a side of said input area;
   an optical source adapted to launch light across said input area towards said second ends of said slab waveguides; and
   a multi-element detector in optical communication with said distal ends of said optical waveguides, wherein each said converging lens is configured to collect light emanating from a focal point within said input area and focus said light into a corresponding optical waveguide, and said optical waveguides guide said light to elements of said multi-element detector.

* * * * *